(12) United States Patent
Somero et al.

(10) Patent No.: US 12,034,203 B2
(45) Date of Patent: Jul. 9, 2024

(54) PROXIMITY SENSOR CONFIGURATION

(71) Applicant: Polar Electro Oy, Kempele (FI)

(72) Inventors: Vesna Somero, Kempele (FI); Ville Majava, Kempele (FI)

(73) Assignee: Polar Electro Oy, Kempele (FI)

( * ) Notice: Subject to any disclaimer, the term of this patent is extended or adjusted under 35 U.S.C. 154(b) by 473 days.

(21) Appl. No.: 17/280,315

(22) PCT Filed: Oct. 1, 2019

(86) PCT No.: PCT/EP2019/076514
§ 371 (c)(1),
(2) Date: Mar. 26, 2021

(87) PCT Pub. No.: WO2020/070094
PCT Pub. Date: Apr. 9, 2020

(65) Prior Publication Data
US 2022/0037771 A1  Feb. 3, 2022

(30) Foreign Application Priority Data
Oct. 2, 2018  (EP) ..................... 18198093

(51) Int. Cl.
*H01Q 1/27* (2006.01)
*H01Q 5/35* (2015.01)
*H01Q 9/04* (2006.01)

(52) U.S. Cl.
CPC ............. *H01Q 1/273* (2013.01); *H01Q 5/35* (2015.01); *H01Q 9/0457* (2013.01); *H01Q 9/0464* (2013.01)

(58) Field of Classification Search
CPC ........ H01Q 1/273; H01Q 5/35; H01Q 9/0457; H01Q 9/0464; G06F 1/163
See application file for complete search history.

(56) References Cited

U.S. PATENT DOCUMENTS

2010/0260082 A1* 10/2010 Lum .................... H04B 1/0057
370/297
2010/0292945 A1   11/2010 Reynolds et al.
(Continued)

FOREIGN PATENT DOCUMENTS

| EP | 2 911 016 A1 | 8/2015 |
| EP | 3 633 500 A1 | 4/2020 |
| WO | 2020/070094 A1 | 4/2020 |

OTHER PUBLICATIONS

International Search Report and Written Opinion received for PCT Application Serial No. PCT/EP2019/076514 dated Nov. 7, 2019, 11 pages.
(Continued)

*Primary Examiner* — Awat M Salih
(74) *Attorney, Agent, or Firm* — FisherBroyles, LLP (57) ABSTRACT

A solution for proximity detection of an object is disclosed. According to an aspect, there is provided a portable training computer, including a communication circuitry configured to operate according to Bluetooth technology; a radio frequency radiator circuitry coupled to the communication circuitry and configured to receive transmission signals from the communication circuitry and radiate the transmission signals as transmission bursts; a measurement circuitry coupled to the radio frequency radiator circuitry and configured to measure an electric property of the radio frequency radiator circuitry and to determine proximity of an object with respect to the radio frequency radiator circuitry on the basis of the measured electric property; and a controller configured to synchronise measurement timings of the measurement circuitry with the transmission bursts.

6 Claims, 5 Drawing Sheets

(56) References Cited

U.S. PATENT DOCUMENTS

| | | | |
|---|---|---|---|
| 2015/0242024 A1* | 8/2015 | Majava | G06F 3/046 |
| | | | 345/174 |
| 2015/0245165 A1 | 8/2015 | Chen et al. | |
| 2016/0036120 A1* | 2/2016 | Sepänniitty | H01Q 1/243 |
| | | | 343/702 |
| 2016/0099604 A1 | 4/2016 | Von Novak, III et al. | |
| 2016/0379604 A1* | 12/2016 | Komulainen | G06F 3/016 |
| | | | 345/184 |

OTHER PUBLICATIONS

Partial European Search Report received for EP Patent Application Serial No. 18198093.9 dated Apr. 5, 2019, 15 pages.

Extended European Search report received for EP Patent Application Serial No. 18198093.9 dated Jul. 8, 2019, 16 pages.

* cited by examiner

PROXIMITY SENSOR CONFIGURATION

CROSS-REFERENCE TO RELATED APPLICATIONS

This application claims benefit and priority to and is a National Phase application of International Application No. PCT/EP2019/076514, filed Oct. 1, 2019, which claims benefit and priority to European Application No. 18198093.9, filed Oct. 2, 2018, which are incorporated by reference herein in their entireties.

FIELD

The present invention relates to a field of proximity sensors configured to sense wirelessly proximity of a human hand or a corresponding user input entity.

SUMMARY

A user interface of an electronic device typically comprises a user input device. Conventional user input devices comprise buttons, peripheral devices such as a mouse or a keyboard, and touch-sensitive sensors. The touch-sensitive sensors comprised in touch-sensitive display, for example, may be based on resistive or capacitive coupling. In both cases, the sensor is based on physical contact between a user input entity, e.g. a finger, and the sensor.

A touch-sensitive sensor based on radio frequency sensing has been proposed in EP 2 911 016. Detection of the user input entity is based on measuring impedance or resonance frequency of an antenna, and the measurement is converted into a user input command.

The present invention is defined by the subject matter of the independent claims.

Embodiments are defined in the dependent claims.

BRIEF DESCRIPTION OF THE DRAWINGS

In the following the invention will be described in greater detail by means of preferred embodiments with reference to the attached [accompanying] drawings, in which.

DETAILED DESCRIPTION

The following embodiments are exemplifying. Although the specification may refer to "an", "one", or "some" embodiment(s) in several locations of the text, this does not necessarily mean that each reference is made to the same embodiment(s), or that a particular feature only applies to a single embodiment. Single features of different embodiments may also be combined to provide other embodiments.

Embodiments of the invention relate to an apparatus attachable to an object such as a human body or a device. Some embodiments encompass the apparatus as a training computer configured to carry out measurements during a physical exercise performed by a user. The training computer may be a portable training computer attached to the user's body (a wearable device) or to training equipment such as a bicycle or a gym device. Such embodiments may employ the training computer to measure physiological training data from the user's performance during the physical exercise and to output the training data to the user via a user interface of the training computer and/or via a user interface of another apparatus. The training computer may employ one or more biometric sensors, one or more motion sensors, and/or other sensors suitable for carrying out measurements during the physical exercise. One example of the biometric sensor is a heart activity sensor employing electrocardiogram (ECG) or photoplethysmogram (PPG) as a measurement technique. Examples of the motion sensor include acceleration sensor configured to measure acceleration along one, two, or three perpendicular directions, a satellite positioning receiver configured to measure position and/or speed, a gyroscope configured to measure rotational motion, and a magnetometer configured to measure motion on the basis of magnetic field measurements. In the context of motion sensors, a sensor fusion may be employed, wherein the sensor fusion is a combination of a three-dimensional accelerometer, a gyroscope, and a magnetometer. Sensor data measured by the sensor fusion may be combined to improve the accuracy of the motion sensing.

Some embodiments of the invention relate to an apparatus arranged to be attached to the object. Such an apparatus may comprise an attachment structure designed and arranged to receive the training computer in a fixed, integrated, or detachable manner and to attach the training computer to the object. The attachment may be realized by a band that may be designed to encircle the object such that the band is attached around the object. The band may comprise locking parts at ends of the band where the locking parts form mutually counterparts such as a buckle and a catch. The locking parts may fix the band around the object as is commonly known in the field of wristwatches, wrist computers etc. In other embodiments, the attachment structure may be arranged to attach the apparatus to the device such as the bicycle. In such embodiments, the apparatus may be or may be comprised in a bike computer, for example.

Figure 1:
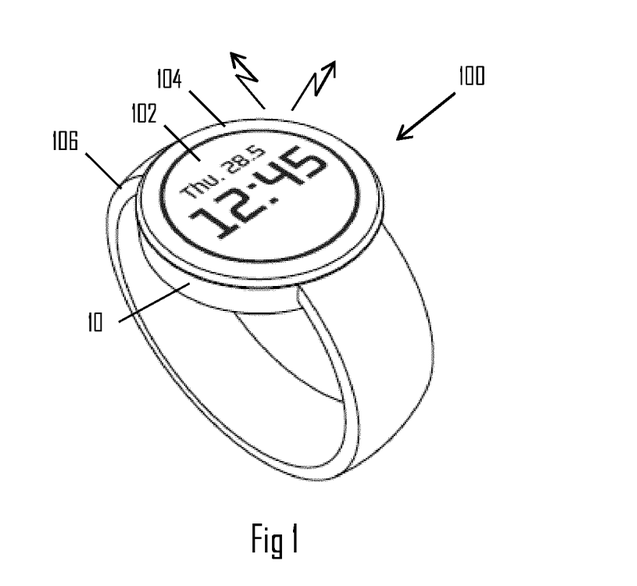
FIG. 1 illustrates a portable training computer according to an embodiment.
Figure 2:
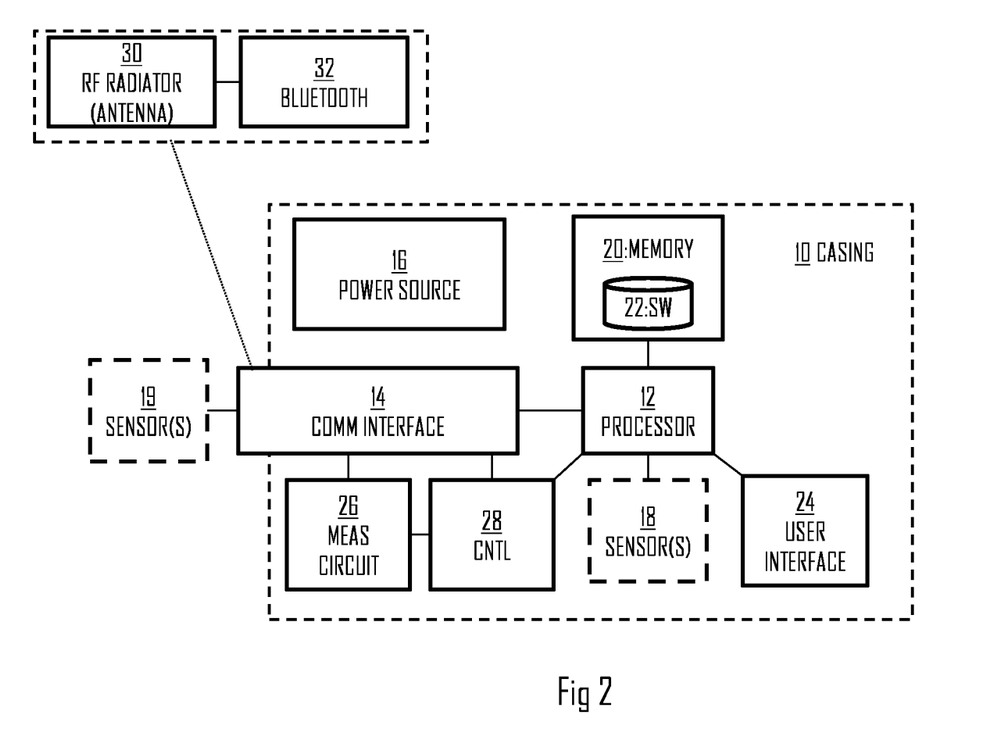
FIG. 2 illustrates a block diagram of a structure of the portable training computer according to an embodiment of the invention.

Referring to FIGS. 1 and 2, let us describe an embodiment of the apparatus 100. The apparatus 100 comprises a casing 10 and a fixing mechanism 106 configured to attach said casing 10 to an object. The casing 10 comprises a display device 102 and at least one processor 12 configured to receive measurement data in a measurement mode during a physical exercise, to process the received measurement data and acquire, as a result of the processing, exercise data and to display the exercise data through the display device 102 during the physical exercise.

The apparatus further comprises a communication interface 14 providing the apparatus with capability of transmitting and receiving signals and data wirelessly. The communication interface comprises a communication circuitry 32 configured to operate according to Bluetooth® technology developed within Bluetooth Special Interest Group (SIG).

The supported Bluetooth technology may include Bluetooth Smart®, Bluetooth Low energy (BTLE) or, in general, any one or more of the Bluetooth evolution versions from version 1.0 up to 5.0 and beyond in the future.

The communication interface 14 further comprises a radio frequency (RF) radiator circuitry coupled to the communication circuitry 32 and configured to receive transmission signals from the communication circuitry 32 and radiate the transmission signals as transmission bursts. The RF radiator circuitry may comprise an antenna or, in some embodiments, a plurality of antennas.

The casing 10 may house a measurement circuitry coupled to the RF radiator (antenna) 30 and configured to measure an electric property of the radio frequency radiator (antenna) circuitry 30 and to determine proximity of an object with respect to the radio frequency radiator circuitry on the basis of the measured electric property. The measurement circuitry 26 may, together with the RF radiator (antenna) 30 form an RF touch-sensitive circuit. The measured electric property may be any one of impedance, resonance frequency, and standing wave ratio of the antenna. The object in the proximity causes a disturbance in near-field characteristics of the antenna, and the disturbance can be measured from at least these electric properties of the antenna. The disturbance may differ depending on the position of the object with respect to the antenna and, as a consequence, the position of the object with respect to the antenna can be measured from the electric property. This enables realizing a RF-touch-sensitive input method for controlling the user interface of the apparatus, for example. The object may be a human hand or a finger, or it may be a user input device. In an embodiment, the solutions described in the Background may be used for the proximity detection.

The casing may further house a controller 28 configured to synchronise measurement timings of the measurement circuitry 26 with the transmission bursts in the RF radiator circuitry. The RF detection of the object may be possible only when there is RF energy in the RF radiator circuitry and, therefore, it may be beneficial to carry out the RF touch sensing measurements only when there is RF energy in the RF radiator circuitry. Accordingly, power-savings may be reached by disabling the measurement circuitry for a duration between the transmission bursts.

With the transmission bursts, emission and/or absorption of RF energy by the RF radiator circuitry may be considered. In other words, the RF touch sensing may be carried out when the communication circuitry 32 is transmitting signals and when the communication circuitry 32 is receiving signals.

The apparatus may comprise a bezel 104 in which at least a part of the RF radiator (antenna) 30 is integrated. For example, the bezel may serve as an antenna of the RF radiator (antenna) 30. The bezel 104 may be attached to the casing 10 in a fixed or rotatable manner. Because a portion of the RF radiator (antenna) 30 may be external to the casing 10, e.g., the antenna, the communication interface is illustrated in FIG. 2 to be partly external to the casing 10. The coupling between the bezel/antenna and other parts of the RF radiator (antenna) 30 may be capacitive and, as a consequence, the electronic components inside the casing 10, such as the processor 12, a power source 16, and the controller may be sealed in a waterproof compartment.

The communication circuitry 32 may provide the apparatus with capability of communicating with external sensors 19, for example. An example of such a system would comprise a heart activity transmitter comprised in a chest strap and the apparatus as a wrist computer. Another example of such a system would comprise a pedalling sensor comprised in a pedal of a bicycle and the apparatus as a bike computer attached to a handlebar of the bicycle. In another embodiment, the communication circuitry may provide a communication connection with another computer device such as a mobile phone, a tablet computer, or a server computer.

The training computer may further comprise a user interface 24 comprising a display screen and input means such as buttons or a touch-sensitive display. In an embodiment, the RF touch sensing serves as a user input system, and the at least one processor 12 may output instructions on the basis of the RF touch sensing to the user interface 24. Additionally, the at least one processor may output information regarding the measured exercise to the user interface 24 for display to the user.

The apparatus may further comprise at least one internal sensor 18 in the casing 10. For example, a wrist computer may comprise an ECG sensor or a PPG sensor for measuring the heart activity. Additionally, one or more of the motion sensors described above may be comprised in the casing. In some embodiments, the sensor interface and the internal sensors are omitted.

The at least one processor 12 may further comprise or have access to at least one memory 20 comprised in the casing. The memory 20 may store a computer program code 22 comprising instructions readable and executable by the at least one processor 12 and configuring the operation of the at least one processor 12. In an embodiment, at least some features of the controller 28 and/or the measurement circuitry may be defined by software and, for that purpose, the at least one memory 20 may be accessible to them as well.

As used in this application, the term 'circuitry' refers to all of the following: (a) hardware-only circuit implementations, such as implementations in only analog and/or digital circuitry, and (b) combinations of circuits and software (and/or firmware), such as (as applicable): (i) a combination of processor(s) or (ii) portions of processor(s)/software including digital signal processor(s), software, and memory(ies) that work together to cause an apparatus to perform various functions, and (c) circuits, such as a microprocessor(s) or a portion of a microprocessor(s), that require software or firmware for operation, even if the software or firmware is not physically present. This definition of 'circuitry' applies to all uses of this term in this application. As a further example, as used in this application, the term 'circuitry' would also cover an implementation of merely a processor (or multiple processors) or a portion of a processor and its (or their) accompanying software and/or firmware.

The techniques and methods described herein may be implemented by various means. For example, these techniques may be implemented in hardware (one or more devices), firmware (one or more devices), software (one or more modules), or combinations thereof. For a hardware implementation, the apparatus(es) of embodiments may be implemented within one or more application-specific integrated circuits (ASICs), digital signal processors (DSPs), digital signal processing devices (DSPDs), programmable logic devices (PLDs), field programmable gate arrays (FPGAs), graphics processing units (GPUs), processors, controllers, micro-controllers, microprocessors, other electronic units designed to perform the functions described herein, or a combination thereof. For firmware or software, the implementation can be carried out through modules of at least one chipset (e.g. procedures, functions, and so on) that perform the functions described herein. The software codes may be stored in a memory unit and executed by processors. The memory unit may be implemented within the processor or externally to the processor. In the latter case, it can be communicatively coupled to the processor via various means, as is known in the art. Additionally, the components of the systems described herein may be rearranged and/or complemented by additional components in order to facilitate the achievements of the various aspects, etc., described with regard thereto, and they are not limited to the precise configurations set forth in the given figures, as will be appreciated by one skilled in the art.

The controller 28 and at least some of the measurement circuitry 26 may be implemented together with the at least one processor 12. For example, the controller and the at least one processor 12 may be realized by the same processor or an array of processors. Signal processing functions of the measurement circuitry 26 may also be implemented together with the at least one processor 12. Therefore, the circuits 12, 26, and 28 of FIG. 2 should be understood as logically separate components that may be implemented by physically the same processor or processing circuitry or by separate processing circuitries.

Figure 3:
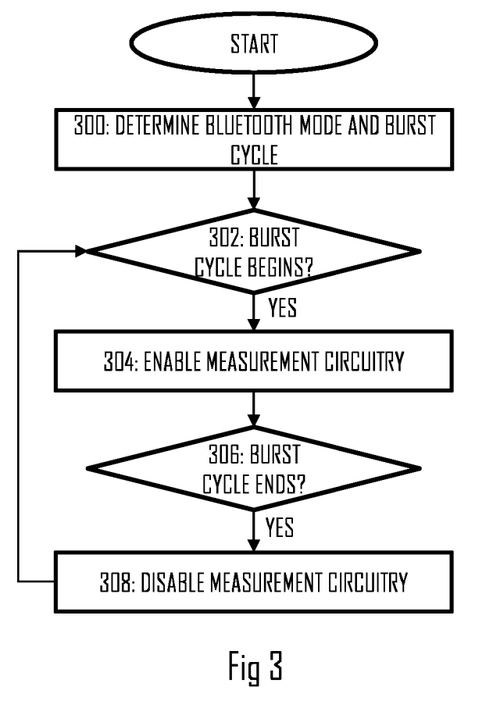
FIG. 3 illustrates a flow diagram of a process for synchronizing proximity measurements to a transmission burst cycle according to an embodiment of the invention.

In an embodiment, the controller 28 is configured to enable the measurement circuitry during the transmission bursts and to disable the measurement circuitry between the transmission bursts. The disabling brings power-savings to the device and prolongs the time the apparatus remains operational before recharging or replacing the power source 16, e.g. a battery. FIG. 3 illustrates an embodiment of such a process executed by the controller 28. Referring to FIG. 3, the process comprises determining a Bluetooth mode of the communication circuitry 32 and associated transmission burst cycle or transmission burst timings (block 300). Bluetooth supports, for example, the following modes illustrated in Table 1.

TABLE 1

| Mode | Transmission burst cycle |
| --- | --- |
| Connected | 7 to 500 milliseconds (ms) |
| Test | Selectable, even continuous |
| Advertise | Selectable |
| Scanning (discoverable) | Minimum 20 ms |
| Broadcast | Selectable |
| Idle (discoverable) | 500 ms |
| Standby | No transmission by default |

In the standby mode, the communication circuitry does not perform any transmission or reception, by default. This mode may be used to conserve power. In the advertising mode, the communication circuitry may transmit packets on advertising channels. In the advertising mode, the communication circuitry may also listen to any responses to the transmitted packets from another Bluetooth device. In the scanning mode, the communication circuitry may scan for advertising packets that are sent over advertising channels. The scanning mode may be used to scan for devices. The scanning may be active or passive. In the active scanning, the communication circuitry may performs transmissions of scan requests and receive responses to the requests from an advertising Bluetooth device. In the connected mode, the communication circuitry may perform transmission and reception of data messages. The test mode is for testing the communication circuitry, for example. Additionally, there is an initiating mode which precedes connection establishment. In this mode, the communication circuitry may scan for advertisements from other Bluetooth devices and, once an advertisement from a desired device is received, the communication circuitry may connect to the device by sending a connection request, for example.

As seen from Table 1, different modes provide different options for selecting the transmission burst cycle. The transmission burst cycle may refer to time between start times of two consecutive transmission bursts transmitted by the communication circuitry 32. From another perspective, the transmission burst cycle may define a frequency of the transmission bursts. The controller 28 may acquire the information on the Bluetooth mode and/or the transmission burst cycle from the communication circuitry 32. In a case where the mode is any other than the connected mode, the communication circuitry may select the transmission burst cycle and, accordingly, inform the controller 28 of the selected cycle. Even in the connected mode, if the communication circuitry 32 operates as a master device, the communication circuitry may select the transmission burst cycle. If the communication circuitry 32 is a slave device, the communication circuitry may still have the information on the transmission burst cycle and inform the controller 28 of the cycle currently in use.

When the transmission bursts are transmitted by the communication circuitry, the communication circuitry is aware of the transmission timings and may inform the controller about the transmission timings so that the controller may adapt the operation of the measurement circuitry to the transmission timings. In the reception, although the communication circuitry does not directly induce the radio energy to the RF radiator circuitry, the communication circuitry may be aware of the timings of transmission bursts received from another Bluetooth communication device. In the connected mode, the communication circuitry may have gained information on the transmission bursts of the paired device, e.g. the sensor device, and may inform the controller accordingly.

By using the information on the transmission burst cycle, the controller 28 may monitor for the start of the next transmission burst cycle. Upon detecting a start of the transmission burst cycle in block 302, the controller 28 may enable the measurement circuitry 26 to measure for the proximity of the object (block 304). The measurements may proceed during the transmission burst cycle. Upon detecting an end of the cycle in block 306, the controller 28 may disable the measurement circuitry 26 in block 308. Thereafter, the process may return to block 302 for a subsequent activation of the measurement circuitry when the next transmission burst cycle begins.

In an embodiment where the transmission burst cycle is shorter than a measurement cycle needed by the measurement circuitry, the controller 28 may maintain the measurement circuitry disabled over one or more transmission burst cycles. One use case for such operation relates to whether or not the object has been detected in the proximity of the RF radiator circuitry. When there is no object detected in the proximity of the RF radiator circuitry, the controller 28 may select a first measurement cycle. When there is an object detected in the proximity of the RF radiator circuitry, the controller 28 may select a second measurement cycle. The second measurement cycle has a higher measurement cycle than the first measurement cycle. Let us assume that the transmission burst cycle is 50 ms, the first measurement cycle is 200 ms, and the second measurement cycle is 50 ms. When the controller determines that the measurement circuitry has not detected the object, the controller may disable the measurement circuitry for a duration of three transmission bursts to acquire the measurement cycle of 200 ms. Whenever the measurement circuitry detects the object in the proximity of the RF radiator circuitry, it may notify the controller, and the controller may switch to the second measurement cycle in which the measurement circuitry is enabled during every transmission burst and, disabled only between the transmission bursts when there is no energy in the antenna. The controller may select the first and second transmission cycle as multiples of the transmission burst cycle, thus synchronizing the measurement instants with the transmission bursts.

Figure 4:
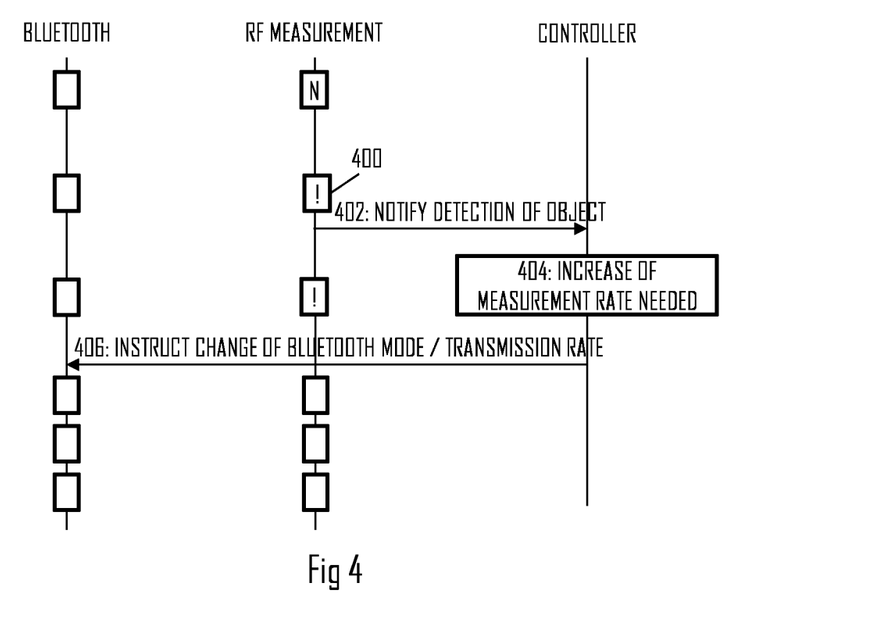
FIG. 4 illustrates a signalling diagram of a procedure for controlling transmission burst cycles according to an embodiment of the invention.

In the embodiments described above, the controller 28 adapts the operation of the measurement circuitry to the transmission bursts of the communication circuitry. In another embodiment, the controller is configured to control, on the basis of an input from the measurement circuitry, the communication circuitry to change the transmission burst cycle. FIG. 4 illustrates such a procedure from the perspective of the communication circuitry (Bluetooth), the measurement circuitry (RF measurement), and the controller.

Referring to FIG. 4, the communication circuitry may at first operate in a first communication mode and transmit the transmission bursts with a transmission burst cycle supported by the first communication mode. The boxes associated with the communication circuitry illustrate the transmission bursts and, as illustrated, there is a pause between the transmission bursts. The measurement circuitry may carry out the proximity measurements during the transmission bursts, as illustrated by the boxes associated with the measurement circuitry) and be disabled between the transmission bursts. As long as there is no object detected during the transmission bursts (denoted by "N"), the controller may maintain the transmission burst cycle. Upon detecting a change in the measured electric property so that the detection of the object is triggered in the measurement circuitry (denoted by "!") in block 400, the measurement circuitry may output a notification of the detection to the controller in step 402.

Upon receiving the notification, the controller may carry out a measure to reduce the length of the transmission burst cycle (block 404). This increases the rate of the measurement opportunities for the measurement circuitry. As a result of block 404, the controller may instruct the communication circuitry in step 406 to switch to a second communication mode that supports a shorter transmission burst cycle, or to reduce the transmission burst cycle within the first communication mode. As illustrated in Table 1, some communication modes such as the test mode allow arbitrary transmission cycles. The test mode is sometimes called a "TX carrier" and/or "TX modulated carrier" mode in the literature. Upon receiving the instruction in step 406, the communication circuitry switches to the second communication mode or reduces the transmission burst cycle within the first communication mode, depending on the embodiment. In each case, the communication circuitry reduces the transmission burst cycle, causing more frequent generation of the transmission burst, thus also increasing the frequency of measurements by the measurement circuitry. This is illustrated in FIG. 4 by the boxes closer to each other after step 406.

The embodiment of FIG. 4 allows for adaptation of the transmission bursts to the required measurements. Therefore, the accuracy of the RF proximity measurements may be increased. Upon detecting from the measured electric property that the object is no longer in the proximity of the RF radiator circuitry, the measurement circuitry may indicate this detection to the controller, and the controller may instruct the communication circuitry to be no longer bound to the shorter transmission burst cycle. In response, the communication circuitry may make autonomous decisions regarding the communication mode and the transmission burst cycle.

From one perspective of the embodiment of FIG. 4, the controller may overrule the communication mode and the transmission burst cycle selected by the communication circuitry, when the measurement circuitry requires greater accuracy to the proximity measurements. When the transmission burst cycle is sufficient for the proximity measurements, the controller may allow the communication circuitry to autonomously select the transmission burst cycle. For the determination of whether or not the transmission burst cycle is sufficient, the memory 20 may store limits for the measurement cycle at different instances, e.g. when the object is detected and when no object is detected. There may be a minimum measurement cycle for each instance. Upon detecting that the communication circuitry does not provide the sufficient transmission burst cycle to meet the minimum measurement cycle, the controller may cause the communication circuitry to shorten the transmission burst cycle to meet the minimum measurement cycle.

In an embodiment of step 406, the controller is configured to cause the communication circuitry to switch from a connected mode to a test mode or to an advertise mode. The switch to the test mode may be triggered, for example, upon detecting a need to recalibrate the measurement circuitry. In the test mode, the communication circuitry may output a continuous RF signal to the RF radiator circuitry which expedites the recalibration.

In an embodiment of step 406, the controller is configured to cause the communication circuitry to change the transmission burst cycle within the connected mode, test mode, advertise mode, scanning mode, or broadcast mode.

Figure 5:
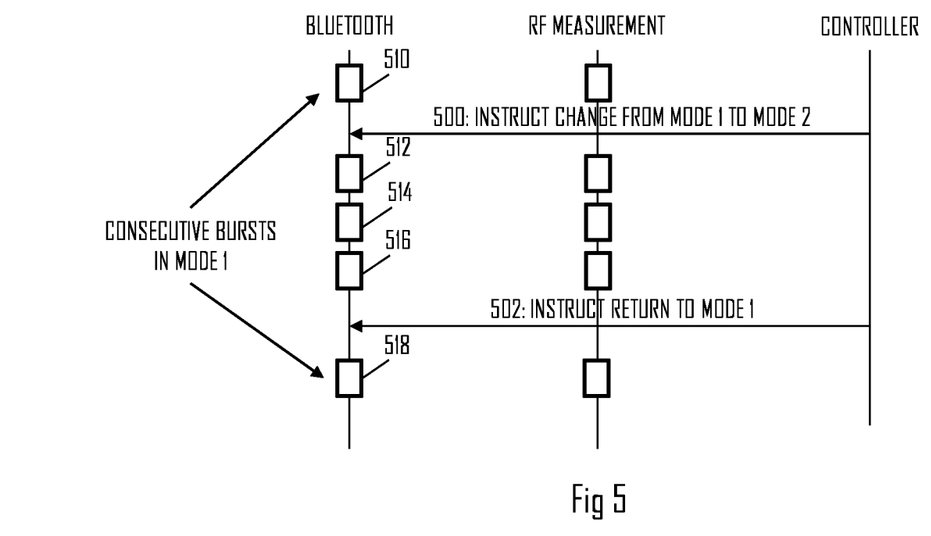
FIG. 5 illustrates a signalling diagram of a procedure for increasing transmission burst rate according to an embodiment of the invention.

In an embodiment, the controller is configured to cause the communication circuitry to change from a first Bluetooth communication mode to a second Bluetooth communication mode and back to the first Bluetooth communication mode between two consecutive transmission bursts of the first Bluetooth communication mode. FIG. 5 illustrates such an embodiment. In this embodiment, the communication circuitry may operate virtually two communication modes at the same time and increase the transmission burst rate without causing a change in the transmission burst cycle of the first Bluetooth communication mode. In this manner, the communication circuitry needs not make any modifications to the configuration of the first Bluetooth communication mode in order to increase the transmission burst rate.

Referring to FIG. 5, the communication circuitry may at first operate in the first Bluetooth communication mode, e.g. the connected mode. The current transmission burst cycle in the first Bluetooth communication mode is illustrated by transmission bursts 510 and 518. The measurement circuitry may carry out the proximity measurements at corresponding timings, as illustrated in FIG. 5. Upon detecting a need for increasing the measurement rate, e.g. upon the detection of the proximity of the object, the controller may instruct the communication circuitry to switch to the second Bluetooth communication mode between the consecutive transmissions of the first Bluetooth communication mode (step 500). The second Bluetooth communication mode may be the test mode, for example. The test mode allows an arbitrary rate of transmission bursts and, as a consequence, the communication circuitry may carry out the transmissions 512, 514, 516 between the transmissions 510 and 518. Before the timing of the transmission burst 518, the communication circuitry may return to the first Bluetooth communication mode, e.g. as instructed by the controller in step 502.

Instead of specifically instructing the mode changes in steps 500 and 502, the controller may output a required measurement cycle to the communication circuitry, and the communication circuitry may then decide a suitable solution to provide the transmission burst cycle that meets the required measurement cycle. For example, the communication circuitry may autonomously carry out the mode changes in the embodiment of FIG. 5 upon receiving the required measurement cycle from the controller.

Instead of actually switching the mode, the communication circuitry may use ad hoc advertisement messages to increase the rate of the transmission bursts, as required by the controller and the measurement circuitry. For example, when the communication circuitry is in the connected mode it may trigger an advertise command that causes transmission of an individual advertisement message between the connected mode transmission bursts. In this manner, the communication circuitry may increase the rate of the transmission bursts without actually changing a mode.

A general concept in the embodiments of FIG. 5 is that the communication circuitry is configured to adapt the transmission bursts to the requirements of the proximity detection so that the rate at which there is radio energy in the RF radiator circuitry meets the required measurement cycle.

Figure 6:
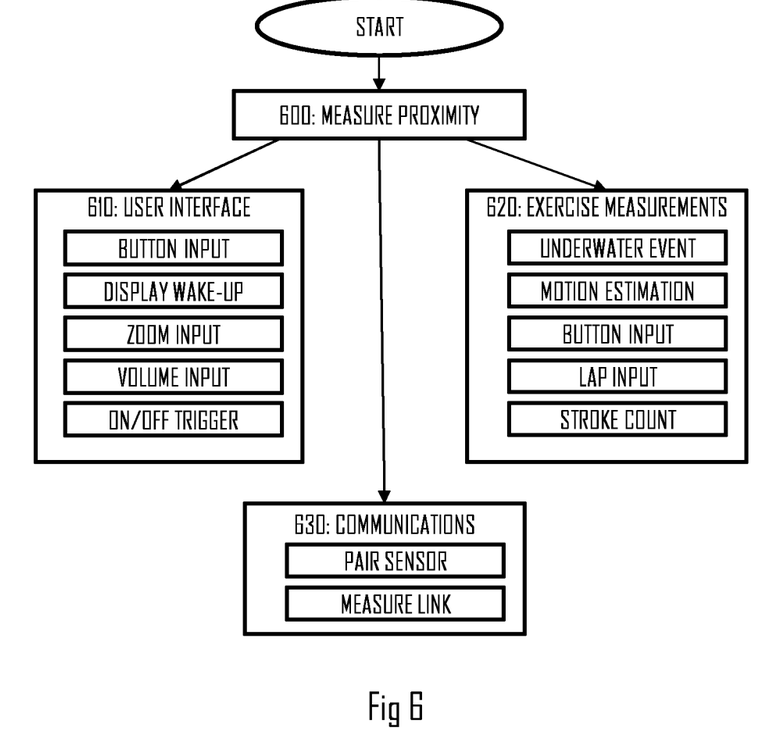
FIG. 6 illustrates some embodiments for implementing proximity sensing.

FIG. 6 illustrates some applications for the measured proximity. Referring to FIG. 6, upon measuring the proximity of the object in block 600, a determined function or functions may be triggered in the apparatus. The function or functions may depend on a mode of the at least one processor 12. For example, in a measurement mode where the at least one processor measures the user during a physical exercise, different set of functions may be available than in an idle mode. The memory 20 may store definitions for the set of functions in the different modes and characteristics of the electric properties in connection with each function. As a consequence, the measurement circuitry is able to detect the proximity and/or the motion of the object with respect to the RF radiator circuitry and interpret the input and the desired function accordingly.

The function may be a user interface function 610, e.g. the at least one processor 12 may operate as a user interface controller configured to convert the determined proximity of the object into a user input command. A button input may be triggered by the user bringing a finger into the contact with the RF radiator circuitry. The measurement circuitry may measure and detect the corresponding change in the electric property and interpret the measurements as the button input. The button input may trigger selection in the apparatus, depending on the current status of the apparatus, e.g. start of a measurement mode. A display wake-up may be triggered by the user bringing a finger into the contact with the RF radiator circuitry. This function may be available only when the display is disabled.

A zoom input may be triggered by the user bringing a finger closer to the RF radiator circuitry (zoom in) or further away from the RF radiator circuitry (zoom out). This function may be triggered by the user first selecting a zooming mode, e.g. with the button input. A volume input may be triggered by the user bringing a finger closer to the RF radiator circuitry (volume up) or further away from the RF radiator circuitry (volume down). This function may be triggered by the user first selecting a volume adjustment mode, e.g. with the button input. With respect to the zooming and volume control functions, the measured impedance, resonance frequency, etc. may change logarithmically when the distance of the object changes linearly. In an embodiment, a linearization function may be applied to the measurements in order to map the logarithmic change of the electric property to a linear scale and, thus realize a zooming function or another function that provides a linear response to the linear movement of the object.

On/off trigger may be may trigger a selection in the apparatus, in a manner similar to the button input. The difference is that the on/off trigger function toggles a function on and off.

The function may be a measurement function 620, e.g. the at least one processor 12 may monitor characteristics of a physical exercise and to detect an event in the physical exercise on the basis of the determined proximity of the object. By using the measurement function(s), the processor(s) may estimate the user's performance during the exercise by using the determined proximity of the object. The measured electric property may change when the apparatus is brought under water. Accordingly, the measurement circuitry is capable of detecting an underwater event. The underwater event detection may trigger a function that changes a configuration of the apparatus, e.g. the communication parameters of the communication circuitry may be changed when the device is underwater. Motion estimation function may employ the proximity detection when estimating user's motion. For example, when the apparatus is a wrist computer, the user's physical activity may change the proximity between user's hand and torso, and the torso or other body parts of the may be detected at the proximity of the RF radiator circuitry. Accordingly, the proximity detection may serve as an input to activity estimation of the apparatus. In connection with periodic motion where the object appears within the proximity of the RF radiator circuitry, the proximity detection may be employed when estimating a stroke count, for example. The above-described button input as well as other inputs of the table 610 may be applicable to the measurement mode as well. The button input or another proximity input may, for example, trigger a lap count function ("tap-a-lap") in the measurement mode.

The function may be a communications function 630, e.g. the detection of the proximity of the object may cause the at least one processor 12 or the controller 28 to change the configuration of the communication circuitry 32. The detection of the object may cause the controller 28 to trigger the communication circuitry 32 to start pairing with a sensor device. This function may be available when the communication circuitry is in an unpaired mode, e.g. the idle mode, advertise mode, or the scanning mode. The detection of the object may cause the controller to configure the communication circuitry to measure a communication link. Since the object disturbs the near-field characteristics of the antenna, it may degrade the communication link. The link measurement may be used to adapt link parameters to counteract the degradation. The link adaptation parameters adjusted on the basis of the link measurement may include a modulation and coding scheme, for example.

Figure 7:
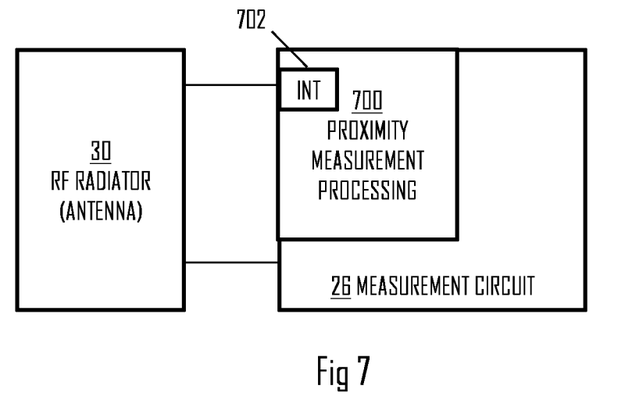
FIG. 7 illustrates an embodiment of a proximity sensing circuitry comprising a wake-up trigger.

In some of the above-described embodiments, the controller 28 may actively switch the measurement circuitry on and off on the basis of the presence and absence of radio energy in the RF radiator circuitry, e.g. on the basis of the information on the transmission burst cycle in use by the communication circuitry 32. FIG. 7 illustrates another embodiment where the enablement of the measurement circuitry is responsive to the detection of the RF energy in the RF radiator circuitry. In this embodiment, the measurement circuitry 26 comprises at least one processor 700, and the trigger circuitry is connected to an interrupt input 702 of the at least one processor and to input, as a response to the detection of the radio signal at the radio frequency radiator circuitry, a wake-up signal to the interrupt input to wake the at least one processor from a sleep mode to determine the proximity of the object with respect to the RF radiator circuitry.

The measurement circuitry may thus stay disabled until there is radio energy in the RF radiator circuitry. The radio energy may function as a trigger that wakes up of the processor 700 to carry out the proximity measurements. This enables passive control of the measurement circuitry, e.g. no separate control signal is required from the controller 28. The controller may, however, control the disabling of the measurement circuitry. In another embodiment, the measurement circuitry may comprise a circuitry that detects the absence of radio energy in the RF radiator circuitry and, as a response to the detection, disables the measurement circuitry.

There may be at least two inputs from the RF radiator circuitry to the measurement circuitry: one for the wake-up function and another for the proximity measurement function.

In an embodiment, the at least one processor comprises the controller 28, and the interrupt input is comprised in the controller 28. The actual implementation of the processing circuitries and controllers may vary according to the implementation.

To summarize the embodiments described above, according to an aspect, there is provided a portable training computer, comprising: a communication circuitry configured to operate according to Bluetooth technology; a radio frequency radiator circuitry coupled to the communication circuitry and configured to receive transmission signals from the communication circuitry and radiate the transmission signals as transmission bursts; a measurement circuitry coupled to the radio frequency radiator circuitry and configured to measure an electric property of the radio frequency radiator circuitry and to determine proximity of an object with respect to the radio frequency radiator circuitry on the basis of the measured electric property; and a controller configured to synchronise measurement timings of the measurement circuitry with the transmission bursts.

In an embodiment, the controller is configured to enable the measurement circuitry during the transmission bursts and to disable the measurement circuitry between the transmission bursts.

In an embodiment, the controller is configured to control, on the basis of an input from the measurement circuitry, the communication circuitry to change a transmission burst cycle.

In an embodiment, the input from the measurement circuitry is indication of detection of the proximity of the object.

In an embodiment, the controller is configured to cause the communication circuitry to change a Bluetooth operational mode in order to increase measurement rate of the measurement circuitry.

In an embodiment, the controller is configured to cause the communication circuitry to switch from a connected mode to a test mode or to an advertise mode.

In an embodiment, the controller is configured to cause the communication circuitry to change from a first Bluetooth communication mode to a second Bluetooth communication mode and back to the first Bluetooth communication mode between two consecutive transmission bursts of the first Bluetooth communication mode.

In an embodiment, the portable training computer further comprises a user interface controller configured to convert the determined proximity of the object into a user input command.

In an embodiment, the portable computer further comprises at least one processor configured to enter a measurement mode where a user of the wearable training computer is measured during a physical exercise, and to estimate in the measurement mode user's performance by using the determined proximity of the object.

In an embodiment, the measurement circuitry comprises at least one processor and, wherein the trigger circuitry is connected to an interrupt input of the at least one processor and to input, as a response to the detection of the radio signal at the radio frequency radiator circuitry, a wake-up signal to the interrupt input to wake the at least one processor from a sleep mode to determine the proximity of the object with respect to the radio frequency radiator circuitry.

Figure 8:
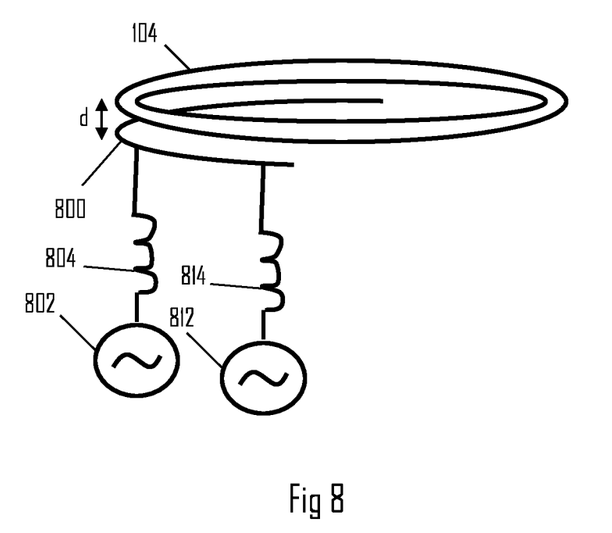
FIGS. 8 to 10 illustrate some embodiments of the RF radiator circuitry.

Let us now describe some embodiments of the RF radiator (antenna) 30. According to an aspect, there is provided a portable training computer, comprising: the casing 10, the bezel 104 coupled to the casing, the RF radiator (antenna) 30 comprising the antenna formed of the bezel, a first signal feed 802 configured to receive or output a first radio signal and a second signal feed 812 configured to receive or output a second radio signal. The portable training computer further comprises an antenna feed circuitry between the antenna and the signal feeds and the antenna, comprising a coupling element 800 configured to couple capacitively to the antenna, a first feed line 804 coupling the first signal feed to the feeding element, a second feed line 814 coupling the second signal feed to the feeding element, and a diplexer circuitry configured to isolate a frequency band of the first radio signal from a frequency band of the second radio signal.

As described above, the capacitive coupling enables waterproof compartment for the antenna feed circuitry, signal feeds, and other sensitive electronic components in the casing 10. The antenna feed circuitry and the diplexer circuitry may thus be comprised in a waterproof compartment inside the casing 10, while the bezel is exposed to water, as in conventional wrist watches comprising a bezel.

In an embodiment, the coupling element is a transmission line following the shape of the bezel, as illustrated in FIG. 8. The coupling element may be provided at a distance d from the bezel to affect the capacitive coupling. The coupling element 800 may follow an annulus formed by the bezel 104 partially, i.e. it may be arranged in parallel with only a part of the bezel.

In an embodiment, a ground contact is coupled to the coupling element 800, e.g. at the other end of the coupling element.

Figure 9:
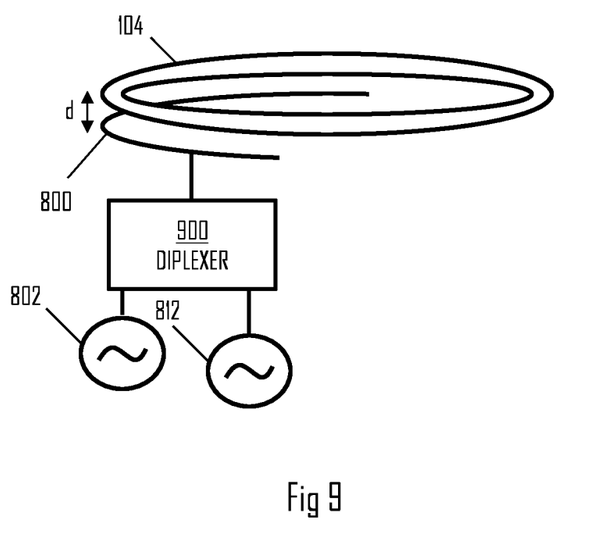

Providing only a single coupling element 800 that couples to the antenna provides savings in space which is important in small casings of portable training devices. The proper isolation between the signals fed by the same coupling element 800 ensures that the signals do not interfere with one another. FIGS. 8 and 9 illustrate some embodiments of the antenna feed circuitry where the diplexer circuitry is configured to carry out the isolation and connect the signal feeds to the coupling element 800.

Referring to FIG. 8, let us describe an embodiment where the isolation of the frequency bands is realized by the first signal line 804 having a first length and a first mutual coupling surface with the antenna, the first coupling surface defined by a first contact point where the first signal lined connects to the feeding element, to form a pass band on the frequency band of the first radio signal, and further by the second signal line 814 having a second length and a second mutual coupling surface with the antenna, the second coupling surface defined by a second contact point where the second signal lined connects to the feeding element, to form a pass band on the frequency band of the second radio signal.

In particular, each signal line 804, 814 is configured to realize a bandpass filter such that the pass bands of the bandpass filters are on different frequency bands and that a desired isolation between the pass bands is realized. The bandpass filter is formed as an LC filter where desired capacitance is formed by the capacitive coupling between the coupling element 800 and the bezel, and where desired inductance is formed by selecting a suitable length for the signal line 804, 814 and/or travel path of the signal line 804, 814.

The length of a distance where the coupling element 800 is in parallel with the bezel 104 as well as the mutual cross-sectional area between the coupling element 800 and the bezel 104 effectively defines a coupling surface between the coupling element and the bezel, similar to electrodes in a capacitor. A contact point where the signal line 804, 814 contacts the coupling element 800 defines an effective coupling surface which may differ depending on the location of the contact point at the coupling element. For example, in FIG. 8 let us assume that the ground contact is provided at the other end of the coupling element with respect to the contact point of the signal line 814. As a consequence, the effective coupling surface for the signal line 804 is smaller than for the signal line 814, thus forming different capacitances for the LC filter.

The inductances may be formed by different lengths of the signal lines 804, 814. The length of the feeding element and the location of the contact points may be taken into account when dimensioning the signal lines such that desired inductance and, as a consequence, desired isolation properties are achieved.

FIG. 9 illustrates an embodiment where the diplexer circuitry comprises a diplexer 900 configured to filter the first radio signal with a first bandpass filter, to filter the second radio signal with a second bandpass filter different from the first bandpass filter, and to combine the first signal line and the second signal line to a common signal line and couple the common signal line to the coupling element 800. Instead of two bandpass filters, one low-pass filter and one high-pass filter may be used. The diplexer may be built of discrete components provided on a printed circuit board.

The embodiment of FIG. 9 distinguishes from the embodiment of FIG. 8 in that there is only one contact point to the coupling element. The diplexer circuitry performs the filtering and couples both signal feeds 802, 812 to the same contact point of the coupling element 800. Again, a ground contact may be provided at a desired location of the coupling element 800.

In an embodiment, the antenna in the embodiments of FIGS. 8 and/or 9 is a single-band antenna.

In an embodiment, the wearable training computer using the RF radiator configuration of embodiment 8 or 9 further comprises the communication circuitry 32 coupled to the RF radiator circuitry, configured to operate according to Bluetooth technology, and further configured to output transmission signals to the RF radiator circuitry, and the measurement circuitry 26 coupled to the RF radiator circuitry and configured to measure the electric property of the radio frequency radiator circuitry and to determine the proximity of the object with respect to the RF radiator circuitry on the basis of the measured electric property.

In another embodiments, the signal feeds 802, 812 are coupled to any two of the following circuitries: a WiFi modem operating according to IEEE 802.11 specifications, a cellular modem operating according to a cellular communication technology, the measurement circuitry configured to perform the proximity sensing, the Bluetooth communication circuitry, and a satellite positioning receiver (e.g. GPS, GLONASS, or Galileo). The cellular communication technology may refer to one or more of wideband code division multiple access (W-CDMA) for Universal Mobile Telecommunication System (UMTS), LTE (Long-Term Evolution) of the UMTS, LTE-Advanced, and 5G system.

Figure 10:
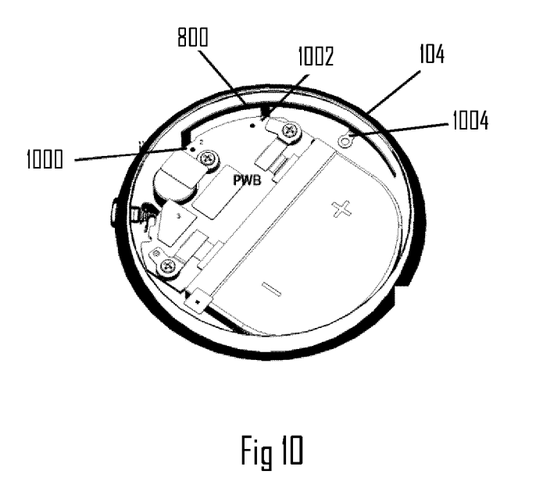

FIG. 10 illustrates a perspective view of an implementation of the embodiment of FIG. 8. Referring to FIG. 10, the coupling element 800 can be seen as running along outlines of the bezel 104 for about one fourth of the annulus of the bezel. The actual length of the coupling element with respect to the annulus of the bezel 104 may depend on the implementation but the length of the coupling element may still be smaller than a circumference of the annulus. The contact points 1000, 1002, of the signal lines can also be seen, as well as the ground contact point 1004. The contact points 1000, 1002 may contact a printed wiring board (PWB) comprising the signal lines 804, 814 and signal feeds 802, 812 as well as the other circuitries described above, depending on the embodiment.

It will be obvious to a person skilled in the art that, as the technology advances, the inventive concept can be implemented in various ways. The invention and its embodiments are not limited to the examples described above but may vary within the scope of the claims.

What is claimed is:

1. A portable training computer, comprising:
a casing;
a bezel coupled to the casing;
a radio frequency radiator circuitry comprising an antenna formed of the bezel;
a first signal feed configured to receive or output a first radio signal and a second signal feed configured to receive or output a second radio signal; and
within a waterproof compartment of the casing and the bezel,
an antenna feed circuitry between the signal feeds and the antenna, comprising a feeding element configured to couple capacitively to the antenna, a first feed line coupling the first signal feed to the feeding element, a second feed line coupling the second signal feed to the feeding element, and a diplexer circuitry configured to isolate a frequency band of the first radio signal from a frequency band of the second radio signal,
wherein the diplexer circuitry comprises a first signal line having a first length and a first mutual coupling surface with the antenna, the first coupling surface defined by a first contact point where the first signal line connects to the feeding element, to form a pass band on the frequency band of the first radio signal, and a second signal line having a second length and a second mutual coupling surface with the antenna, the second coupling surface defined by a second contact point where the second signal lined connects to the feeding element, to form a pass band on the frequency band of the second radio signal, wherein the isolation of the frequency bands is realized by the first signal line and the second signal line,
wherein each of the first signal line and the second signal line forms an LC filter where a desired capacitance is formed by the capacitive coupling between the feeding element and the respective first coupling surface and the second coupling surface, and where a desired inductance is formed by the length of the respective first signal line and second signal line and/or by a travel path of the respective first signal line and second signal line, and wherein the first signal line has different LC parameters than the second signal line to realize the isolation of the frequency bands.

2. The portable training computer of claim 1, further comprising:
a communication circuitry coupled to the radio frequency radiator circuitry, configured to operate according to Bluetooth technology, and further configured to output transmission signals to the radio frequency radiator circuitry; and
a measurement circuitry coupled to the radio frequency radiator circuitry and configured to measure an electric property of the radio frequency radiator circuitry and to determine proximity of an object with respect to the radio frequency radiator circuitry on the basis of the measured electric property.

3. The portable training computer of claim 1, wherein the antenna is a single-band antenna.

4. The portable training computer of claim 1, wherein the feeding element is the only feeding element feeding a radio signal to the bezel.

5. The portable training computer of claim 1, wherein the diplexer circuitry comprises a diplexer configured to combine the first signal line and the second signal line to a common signal line and couple the common signal line to the coupling element.

6. The portable training computer of claim 1, wherein the first signal feed and the second signal feed are coupled to any two of the following circuitries: a WiFi modem operating according to IEEE 802.11 specifications, a cellular modem operating according to a cellular communication technology, a Bluetooth® communication circuitry, and a satellite positioning receiver.

* * * * *